(12) United States Patent
Youn (10) Patent No.: US 9,136,903 B2
(45) Date of Patent: Sep. 15, 2015

(54) METHOD FOR RESIZING NETWORK CONNECTION IN THE OPTICAL TRANSPORT NETWORK SUPPORTING PROTECTION SWITCHING

(71) Applicant: Electronics and Telecommunications Research Institute, Daejeon-si (KR)

(72) Inventor: Ji-Wook Youn, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 140 days.

(21) Appl. No.: 13/965,750

(22) Filed: Aug. 13, 2013

(65) Prior Publication Data

US 2014/0086581 A1   Mar. 27, 2014

(30) Foreign Application Priority Data

Aug. 14, 2012  (KR) .................. 10-2012-0089152
Aug. 24, 2012  (KR) .................. 10-2012-0093220
Aug. 13, 2013  (KR) .................. 10-2013-0095853

(51) Int. Cl.
*H04J 14/00* (2006.01)
*H04B 10/03* (2013.01)
*H04B 1/74* (2006.01)
*H04Q 11/00* (2006.01)
*H04J 3/14* (2006.01)
*H04J 3/16* (2006.01)

(52) U.S. Cl.
CPC ... *H04B 1/74* (2013.01); *H04J 3/14* (2013.01); *H04J 3/1664* (2013.01); *H04Q 11/0062* (2013.01); *H04J 2203/006* (2013.01); *H04J 2203/0069* (2013.01); *H04Q 2011/0081* (2013.01); *H04Q 2011/0086* (2013.01)

(58) Field of Classification Search
USPC ......................................................... 370/228
See application file for complete search history.

(56) References Cited

U.S. PATENT DOCUMENTS

| 2007/0292129 | A1* | 12/2007 | Yan et al. ........................... 398/5 |
| 2011/0286744 | A1* | 11/2011 | Shin et al. ....................... 398/45 |
| 2012/0163812 | A1* | 6/2012 | Youn et al. ..................... 398/45 |
| 2013/0011132 | A1* | 1/2013 | Blair ................................ 398/2 |
| 2013/0101292 | A1* | 4/2013 | Lanzone et al. ............... 398/66 |
| 2013/0243427 | A1* | 9/2013 | Lin ................................ 398/45 |
| 2013/0259476 | A1* | 10/2013 | Shinohara et al. ............. 398/52 |
| 2013/0279904 | A1* | 10/2013 | Tang et al. ..................... 398/25 |
| 2013/0294229 | A1* | 11/2013 | Togo et al. .................... 370/228 |
| 2014/0016925 | A1* | 1/2014 | Ceccarelli et al. ............... 398/5 |

FOREIGN PATENT DOCUMENTS

KR   10-2011-0127077 A   11/2011

* cited by examiner

*Primary Examiner* — Li Liu
(74) *Attorney, Agent, or Firm* — Rabin & Berdo, P.C.

(57) ABSTRACT

There is provided a method for resizing a network connection in an optical transport network that supports protection switching and receives a flexible Optical channel Data Unit (ODUflex(GFP)) signal. In addition, at nodes located on a protection path for protection switching, only a Link Connection Resize (LCR) protocol, except for a Bandwidth Resize (BWR) protocol, of Hitless Adjustment of ODUflex(GFP) (HAO) procedure is executed. On the other hand, both the LCR protocol and the BWR protocol are executed at nodes located on a working path for protection switching.

13 Claims, 5 Drawing Sheets

FIG. 1

| Column Row | 15 |
|---|---|
| 1 | RCOH1 |
| 2 | RCOH2 |
| 3 | RCOH3 |
| 4 | PSI |

OPUflex OH

| | 1 | 2 | 3 | 4 | 5 | 6 | 7 | 8 |
|---|---|---|---|---|---|---|---|---|
| 1 | BWR_IND | RES | RES | | | RES | | |
| 2 | BWR_IND | NCS | RES | | | RES | | |
| 3 | CRC-3 | | | | | RES | | |

OPUflex RCOH

| Column Row | 15 |
|---|---|
| 1 | RCOH1 |
| 2 | RCOH2 |
| 3 | RCOH3 |
| 4 | PSI |

HO OPUk OH

| | 1 | 2 | 3 | 4 | 5 | 6 | 7 | 8 |
|---|---|---|---|---|---|---|---|---|
| 1 | RP | RES | RES | | | TPID | | |
| 2 | TSCC | RES | RES | TSGS | CTRL | | TPID | |
| 3 | CRC-3 | | | | CRC-5 | | | |

HO OPUk RCOH

METHOD FOR RESIZING NETWORK CONNECTION IN THE OPTICAL TRANSPORT NETWORK SUPPORTING PROTECTION SWITCHING

CROSS-REFERENCE TO RELATED APPLICATION(S)

This application claims the benefit under 35 U.S.C. §119(a) of a Korean Patent Application Nos. 10-2012-0089152, filed on Aug. 14, 2012, 10-2012-0093220, filed on Aug. 24, 2012, and 10-2013-0095853, filed on Aug. 13, 2013, in the Korean Intellectual Property Office, the entire disclosures of which are incorporated herein by references for all purposes.

BACKGROUND

1. Field

The following description relates to a method for resizing a network connection in an optical transport network, and, more specifically, to a method for resizing a network connection is in an optical transport network that supports protection switching.

2. Description of the Related Art

An optical transport network boasts a wide bandwidth, high reliability and a well-developed protection switching function, and supports Operations Administration and Management (OAM) technologies. To effectively receive packet data, the amount of which is now explosively increasing, there are many attempts to develop a method for transporting packet data in an optical transport network. International Telecommunication Union Telecommunication standardization sector (ITU-T), which is an international organization in charge of standardization work, has standardized a technology for more effectively receiving Ethernet data in an optical transport network. In an effort to flexibly receive a client signal, especially a packet signal, with high transmission efficiency, the ITU-T, defines a flexible Optical channel Data Unit (ODUflex) signal which refers to a Generic Framing Procedure (GFP)-encalsulated packet signal that adds ODUflex overhead to ODUflex payload. In general, the ODUflex signal is used as an ODUflex(GFP) signal.

In addition, the ITU-T has developed a resize protocol that can increase or decrease a size of the ODUflex(GFP) signal without affecting a network. Specifically, the resize protocol is defined as ITU-T G.7044/Y.1347(10/2011) standard or an Hitless Adjustment of ODUflex(GFP) (HAO) procedure. The ITU-T G.7044/Y.1347(10/2011) stand or the HAO process is a resize procedure for increasing or decreasing a network connection. Korea Patent Publication No. 10-2011-0127077 introduces a dynamic packet transmission technology titled "METHOD AND APPARATUS FOR TRANSMITTING PACKET IN OPTICAL TRANSPORT NETWORK" that solves the drawbacks of an existing HAO protocol to increase or decrease the amount of packet to be transmitted without packet loss regardless of a size of packet frame.

In this reference, it is assumed that actual packet data is transmitted, and a dynamic resize procedure for a path on which the packet data is transmitted is defined. In addition, for swift restoration at an occurrence of any error or fault in a network that support protection switching, a protection path is set in advance. The HAO protocol according to the ITU-T G.7044/Y.1347(10/2011) stand may be applied in a procedure for changing a bandwidth of a working path in an optical transport network receiving an ODUflex signal, but may be difficult to be applied in a procedure for changing a bandwidth of a protection path.

SUMMARY

The following description aims to provide a method for resizing a network connection in an optical transport network where a protection path as well as a working path is set for protection switching.

The following description also aims to solve a problem that occurs when the optical transport network receives an ODUk (Optical channel Data Unit, k=1, 2, 3, 4, flex) signal for protection switching.

To meet the above-described goals, in one general aspect of the present invention, there is provided a method for resizing a network connection in an optical transport network that supports protection switching and receives a flexible Optical channel Data Unit (ODUflex(GFP)) signal, the method including executing, at first nodes located on a protection path for protection switching, only a Link Connection Resize (LCR) protocol, except for a Bandwidth Resize (BWR) protocol, of Hitless Adjustment of ODUflex(GFP) (HAO) procedure.

The method may further include executing, second nodes located on a working path for protection switching, both the LCR protocol and the BWR protocol.

A protection-path resize command indicating execution of the only the LCR protocol, except for the BWR protocol, may be received to the first nodes from a Network Management System (NMS) or a control plane.

The protection-path resize command may be a protection-path $INCREASE_p$ command, and the HAO procedure is terminated without executing the BWR protocol when the LCR protocol is completed.

The protection-path resize command may be a protection-path $DECREASE_P$ command, and the HAO procedure is terminated without executing the BWR protocol by completing the LCR protocol that has been never suspended ever since initiation thereof.

The protection-path resize command may be transmitted from the NMS or the control plane only to end nodes, except for intermediate nodes, among the first nodes.

The protection-path resize command may be transmitted from the NMS or the control plane to all of the first nodes.

In still another general aspect of the present invention, there is provided a method for increasing a network connection in an optical transport network that support protection switching and a flexible Optical channel Data Unit (ODUflex (GFP)) signal, the method including initiating, at first nodes located on a protection path for protection switching, a Link Connection Resize (LCR) protocol of Hitless Adjustment of ODUflex(GFP) (HAO) procedure; increasing, at the first nodes, a link connection to increase a number of tributary slots (TSs); and terminating the HAO procedure without executing, at the first nodes, a Bandwidth Resize (BWR) protocol of the HAO procedure.

In the initiating of the LCR protocol, High Order-Optical channel Payload Unit-k overhead (HO OPUk OH) indicating "ADD" in a CTRL field of LCR protocol overhead may be used.

The method may further include terminating the HAO procedure by executing both the LCR protocol and the BWR protocol at second nodes located on a working path for protecting switching.

The method may further include, before the initiating of the LCR protocol, transmitting from a Network Management System (NMS) or a control plane to the first nodes a protection-path INCREASE$_P$ command indicating execution of only the LCR protocol, except for the BWR protocol.

In yet another general aspect of the present invention, there is a method for decreasing a network connection in an optical transport network that support protection switching and a flexible Optical channel Data Unit (ODUflex(GFP)) signal, the method including initiating, at first nodes located on a protection path for protection switching, a Link Connection Resize (LCR) protocol of Hitless Adjustment of ODUflex (GFP) procedure; and terminating the HAO procedure without executing, at the first nodes, a Bandwidth Resize (BWR) protocol of the HAO procedure ever since the initiation of the LCR protocol.

In the initiating of the LCR protocol, High Order-Optical channel Payload Unit-k overhead (HO OPUk OH) indicating "REMOVE" in a CTRL field of LCR protocol overhead may be used.

The method may further include terminating the HAO procedure by executing both the LCR protocol and the BWR protocol at second nodes located on a working path for protection switching.

The method may further include, before the initiating of the LCR protocol, transmitting from a Network Management System (NMS) or a control plane to the first nodes a protection-path DECREASE$_P$ command indicating execution of only the LCR protocol, except for the BWR protocol.

Other features and aspects may be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The following embodiments of the present invention relate to supporting protection switching in an optical transport network that receives an ODU flex (GFP) defined in ITU-T. Protection switching is one of methods for swiftly restoring connection between nodes when a fault occurs on a network. For protection switching, a protection path P with a specific bandwidth is set between nodes in advance, in addition to a working path W. Thus, when communication between nodes is impossible via the working path W due to occurrence of a fault on a network, communication between nodes is restored through the protection path P.

The ITU-T G.7044/Y.1347(10/2011) standard defines a procedure of resizing a network connection, the procedure which does not lead to packet loss on a network receiving a ODUflex(GFP) signal. The procedure is referred to as Hitless Adjustment of ODUflex(GFP) (HAO) procedure. According to the ITU-T G.7044/Y.1347(10/2011) standard, the HAO procedure includes Link Connection Resize (LCR) protocol and a BandWidth Resize (BWR) protocol. (Hereinafter, 'the network connection resize procedure' is meant to include the LCR protocol and the BWR protocol) That is, the procedure of resizing a network connection needs to be done using the LCR protocol and the BWR protocol separately. In addition, various kinds of information required for executing an LCR protocol and a BWR protocol, respectively, is included in Resize Control Overhead (RCOH) and then transferred.

Figure 1:
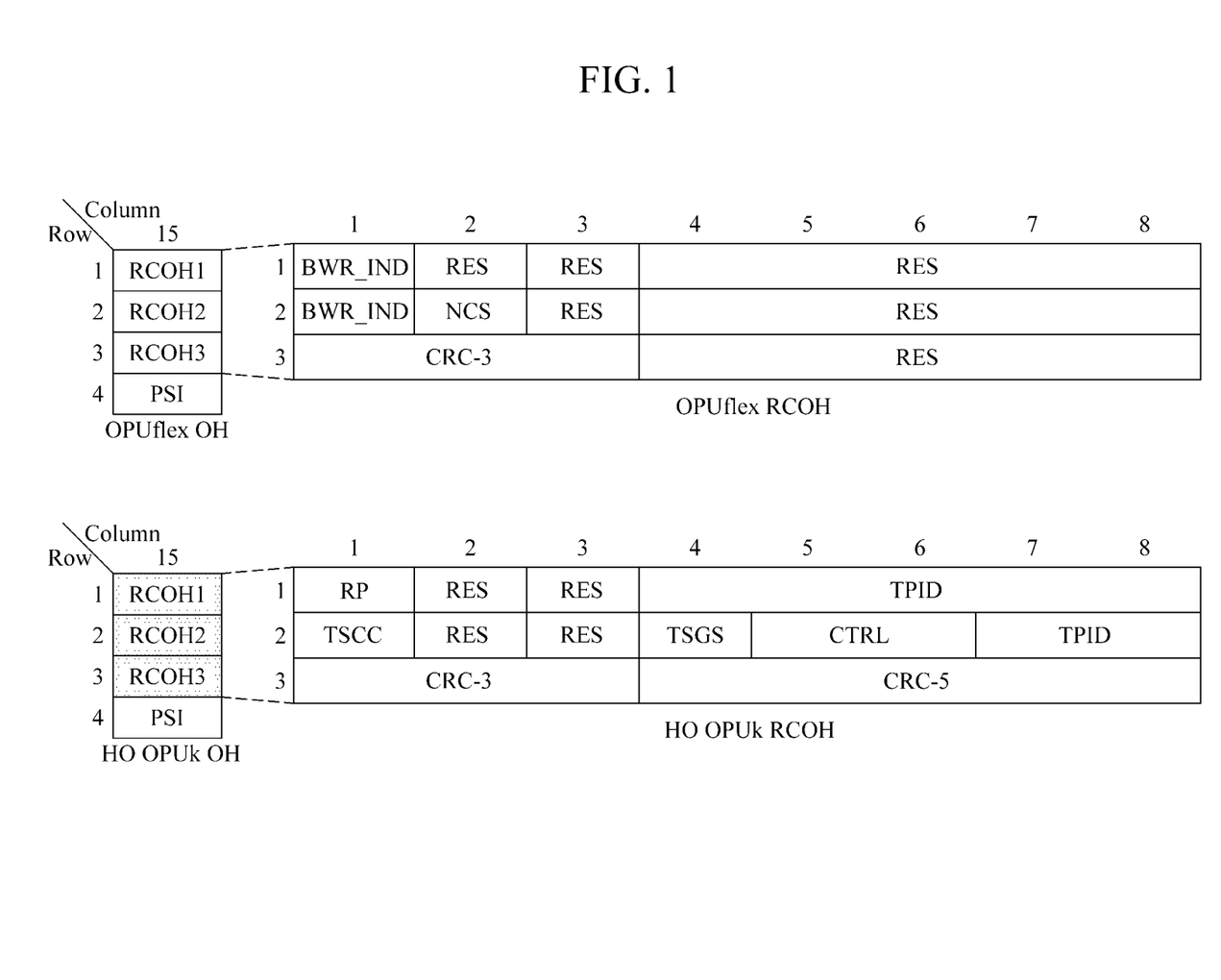
FIG. 1 is a diagram illustrating a format of Resize Control Overhead (RCOH) defined by ITU-T G.7044/Y.1347(10/2011).

FIG. 1 is a diagram illustrating a format of RCOH defined by the ITU-T G.7044/Y.1347(10/2011) standard. Referring to FIG. 1, RCOH is included in OPUflex overhead (OH) and in High Order-Optical channel Payload Unit-k overhead (HO OPUk OH), and then transferred. Information included in the RCOH may be classified into information for an LCR protocol (that is, LCR protocol overhead) and information for a BWR protocol overhead (that is, BWR protocol overhead). The LCR protocol overhead includes a control (CTRL) field, a Tributary Port ID (TPID) field and a Tributary Slot Group Status (TSGS) bit. The BWR protocol overhead includes a Network Connectivity Status (NCS) bit, a Tributary Slot Connectivity Check (TSCC) bit, a Resizing Protocol indicator (RP) bit and a Bandwidth Resize Indicator (BWR_IND) bit.

Figure 2:
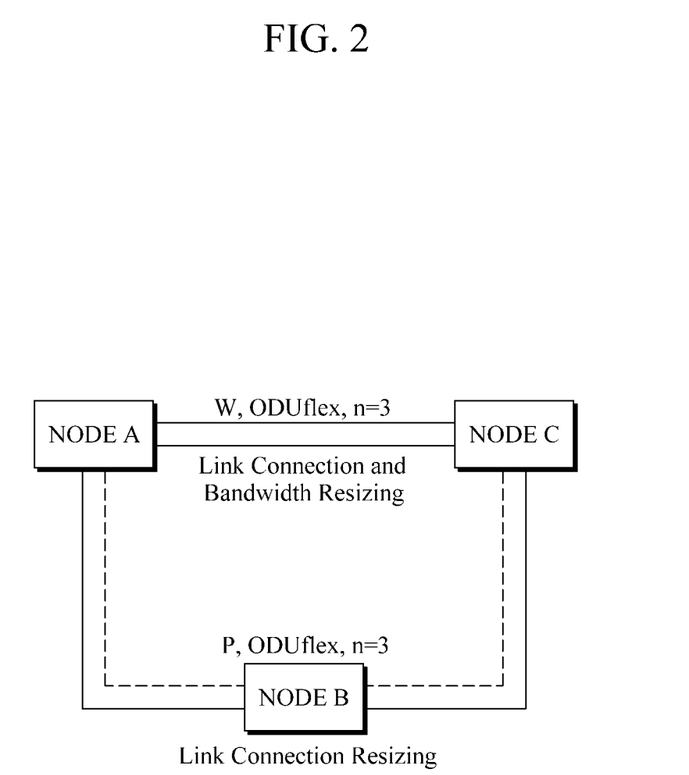
FIG. 2 is a diagram illustrating protection switching in an optical transport network receiving an ODU flex signal and a resize procedure therefor.

FIG. 2 is a diagram for explaining a concept of protection switching in an optical transport network that receives an ODUflex signal and a concept of a resize procedure for the optical transport network. Referring to FIG. 2, a working path W is set between end nodes A and C, on which actual data is transmitted. In addition, a protection path P connects the end nodes A and C to one another through an intermediate node B for protection switching. FIG. 2 illustrates an example in which the working path W between the nodes A and C consist of three TSs (TS, n=3) while the protection path P that connects the nodes A and C through the node B consists of three TSs (TS, n=3). Yet, the number of TSs in the above case is merely exemplary. Further, the TSs of the working path W do not need to be consecutive, and instead, the working path W may consist of arbitrary TSs. Moreover, TSs of the protection path P does not need to be the same as those of the working path W.

In order to effectively support protection switching when there is a change in a network connection (for example, increase or decrease in the number of TSs) in an optical transport network configured as shown in FIG. 2, a procedure of resizing a network connection has to be completed with respect to both the working path W and the protection path P. In addition, in order to complete the procedure of resizing a network connection with respect to both the working path W and the protection path P when the ITU-T G.7044/Y.1347(10/2011) standard is applied to the optical transport network that receives an ODUflex signal, a resize procedure according to the HAO procedure has to be done with respect to both the working path W and the protection path P. Specifically, in order to increase or decrease a bandwidth of an ODUflex signal with respect to the working path W in an operating the optical transport network, an HAO protocol should be executed not only at nodes of the working path W (for example, between the nodes A and B in FIG. 2) but also at nodes of the protection path P (for example, between the nodes A and B and between the nodes B and C in FIG. 2). That is, the resize procedure according to the ITU-T G.7044/Y.1347(10/2011) standard has to be performed with respect to the protection path P as well as the working path W. To put it simply, each of an LCR protocol and a BWR protocol needs to be executed on both the working path W and the protection path P.

However if there is not error or fault on a protection-switching supporting optical transport network configured as shown in FIG. 2 so the working path W operates normally, an OPUflex signal is transmitted only via the working path W, not via the protection path P. Accordingly, a node located only on the protection path P is unable to transmit and/or receive the OPUflex signal, and, in turn, cannot utilize information included in an OPUflex RCOH. Since the information included in an OPUflex RCOH is not transmitted via a protection path P, the resize procedure according to the ITU-T G.7044/Y.1347(10/2011) standard cannot be completed which aims to support protection switching in an optical transport network that receives an ODUflex signal.

However, the present invention is able to solve the above-described drawback as follows: an LCR protocol and a BWR protocol, both of which are according to the ITU-T G.7044/Y.1347(10/2011) standard, are executed on a working path W, but only the LCR protocol is executed on a protection path P. Specifically, both a link connection and a bandwidth of the working path W, but only the link connection, except for the bandwidth, of the protection path P is changed. In other words, an actual data signal is transmitted via the working path W, but not via the protection path P, even in an optical transport network that supports protection switching, so that transmission of an ODUflex signal may not be affected although a bandwidth of a protection path is not increased or decreased during the network connection resize procedure.

Hereinafter, a method for resizing a network connection in an optical transport network that receives an ODUflex signal and supports protection switching according to an exemplary embodiment of the present invention will be described.

Figure 3:
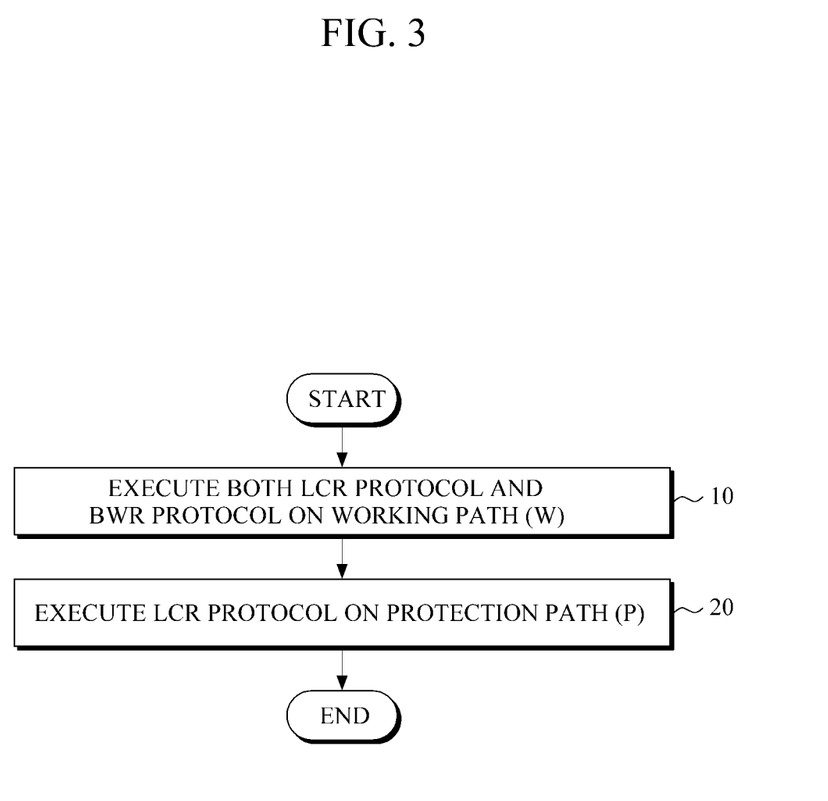
FIG. 3 is a flow chart illustrating a method for resizing a network connection in the optical transport network shown in FIG. 2.

FIG. 3 is a flow chart illustrating a method for resizing a network connection in the optical transport network shown in FIG. 2, which receives an ODUflex signal and supports protection switching, according to an exemplary embodiment of the present invention. In the following, descriptions about an LCR protocol and a BWR protocol, both of which are according to an HAO protocol, will be provided, and any specific description not provided herein may be the same as specified in the ITU-T G.7044/Y.1347(10/2011) standard.

Referring to FIGS. 2 and 3, if a network connection resize procedure in an optical transport network begins, the resize procedure starts with respect to a working path W that directly connects nodes A and C with each other in operation 10. A resize procedure according to the ITU-T G.7044/Y.1347(10/2011) standard includes executing both an LCR protocol and a BWR protocol, and details thereof are not provided herein since the same is specified in detail in the ITU-T G.7044/Y.1347(10/2011) standard.

With respect to a protection path P that connects the nodes A and C via the node B, the LCR protocol is executed but the BWR protocol is not executed in operation 20. That is, the BWR protocol is not executed on the protection path P. Meanwhile, FIG. 3 illustrates an example where operation 10 is performed before operation 20, but it merely aims to clarify the features of the present invention. That is, operation 20 may be performed before operation 10 or operation 10 and 20 may be performed concurrently.

Figure 4:
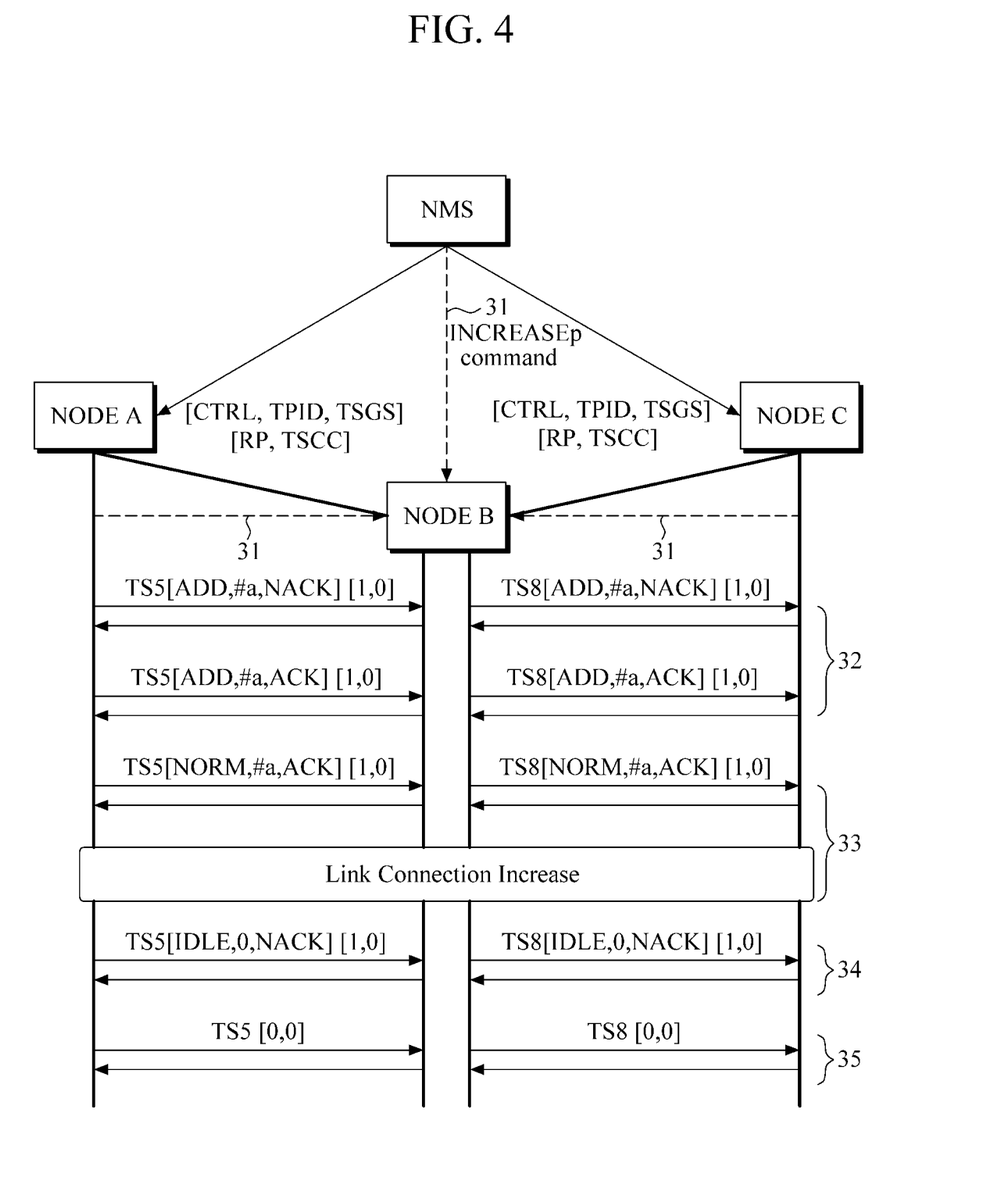
FIG. 4 is a flow chart illustrating an example in which operation 20 in FIG. 3 is applied in a procedure of increasing a network connection.

FIG. 4 is a flow chart illustrating an example of increasing a network connection with respect to a protection path P in the event that a bandwidth of an ODUflex signal transmitted via a working path W in the optical transport network shown in FIG. 2 is increased, the event which is, for example, when the number of TSs increases from 3 to 4. That is, FIG. 4 is an example in which operation 20 in FIG. 3 is applied in a network connection increasing procedure. It is apparent that the number indicating a TS to be added in FIG. 4 (that is, TS 5 and TS 8) and a numerical value in the TPID filed (that is, #a) are merely exemplary. In addition, what is indicated by "ADD", "NORM" or "IDLE" which is a command corresponding to a CTRL field, what is indicated by "NACK" or "ACK" which corresponds to a TSGS bit, what is indicated by "0" or "1" which corresponds to RP bit, and what is indicated by "0" which corresponds to TSCC bit complies with the above-described the ITU-T G.7044/Y.1347(10/2011) standard, so that details description thereof are not provided herein.

Referring to FIG. 4, a command for increasing the number of TSs is transmitted to nodes of the protection path P in operation 31. The command is a command indicating addition of TS. In addition, the command may be transmitted from a Network Management System (NMS) or a control plane directly to every node of the protection path P, such as the nodes A, B and C.

Alternatively, the command may be transmitted from the NMS or the control plane to end nodes located on both ends of a link, such as the node A and node C, or to the nodes of the working path W, except for nodes that are located only at the protection path P (for example, the node B). In this case, nodes not receiving the command from the NMS or the control plane may receive the same command from other nodes that has received the command directly or indirectly from the NMS. In addition, a signal may be inserted into HO OPUk RCOH or HO ODUk overhead to thereby be transmitted from an end node, such as the nodes A and B, to an intermediate node, such as the node B.

The above-described increase command is a protection-path resize command, for example, an increase command for a protection path, and the name thereof is merely exemplary. The protection-path INCREASE$_P$ command is a command indicating execution of only an LCR protocol among the resize procedure according to the ITU-T G.7044/Y.1347(10/2011) standard. In a preferable example, a type of the increase command is be distinguishable from an increase command received from the NMS or the control plane according to the ITU-T G.7044/Y.1347(10/2011) standard. However, aspects of the present invention is not limited thereto, and a type of the increase command may be identical to an increase command received from an NMS or a control plane according to the ITU-T G.7044/Y.1347(10/2011) standard. In the latter case, nodes receiving the increase command need to be configured to execute only an LCR protocol, except for a BWR protocol.

The nodes receiving the increase command (for example, the nodes A, B and C) start to execute the LCR protocol in operation 32. Specifically, each of the nodes checks configuration or availability of a TS to be added or a set of TSs to be added.

With respect adjacent nodes, each of the node exchanges HO OPUk OH indicating [ADD, #a, NACK] and [1, 0] respectively corresponding to [CTRL, TPID, TSGS] and [RP, TSCC] of HO OPUk RCOH. In addition, after checking whether a signal indicating "ADD" in a CTRL field is received from any adjacent node and whether configuration of a TS of a local port is the same as that of a TS of a port of the adjacent port, each node (or a port of each node) transmits a signal set as a "ACK" value in a TSGS bit to the adjacent node in operation 32.

As such, if bidirectional LCR handshaking is successfully completed, each node (or a port of each node) starts a link connection increase procedure in operation 33. Herein, the fact that the LCR handshaking is successfully completed means that a configuration check of a TS related to resizing the same link connection has been passed, and at the same time, a signal indicating "ACK" in a TSGS bit is transmitted and received. If the signal of "ACK" is received on every TS to be added, an end node (or a port of an end node) transfers a signal of [NORM, #a, ACK], rather than a signal of [ADD, #a, ACK] at the resize multiframe boundary after the LCR handshaking. The change from [ADD, #a, ACK] into [NORM, #a, ACK] notifies a downstream port that link connection increase would start at the next resize multiframe boundary. Then, at the first resize multiframe boundary after transmitting [NORM, #a, ACK], the nodes start the link connection increase.

After completing the LCR resize and receiving a signal of CTRL=NORM, each of the nodes A, B and C terminates the LCR protocol by transferring [IDLE, 0, NACK] in operation 34. After checking that the signal of CTRL=IDLE is received from an adjacent node, the LCR protocol is terminated.

Instead of executing the BWR protocol after completing the LCR protocol, each of the nodes terminates the HAO procedure according to the ITU-T G.7044/Y.1347(10/2011) standard in operation 35. According the exemplary embodiment of the present invention, there is no limitation in how to terminate the HAO procedure without initiating the BWR protocol. For example, as shown in operation 35 in FIG. 4, each of the nodes may terminate the HAO procedure by transmitting and receiving a signal of "0" in the RP field to adjacent nodes. The transmission of the signal may be possible using HO OPUk RCOH of HO ODUk OH, but it is merely exemplary.

Figure 5:
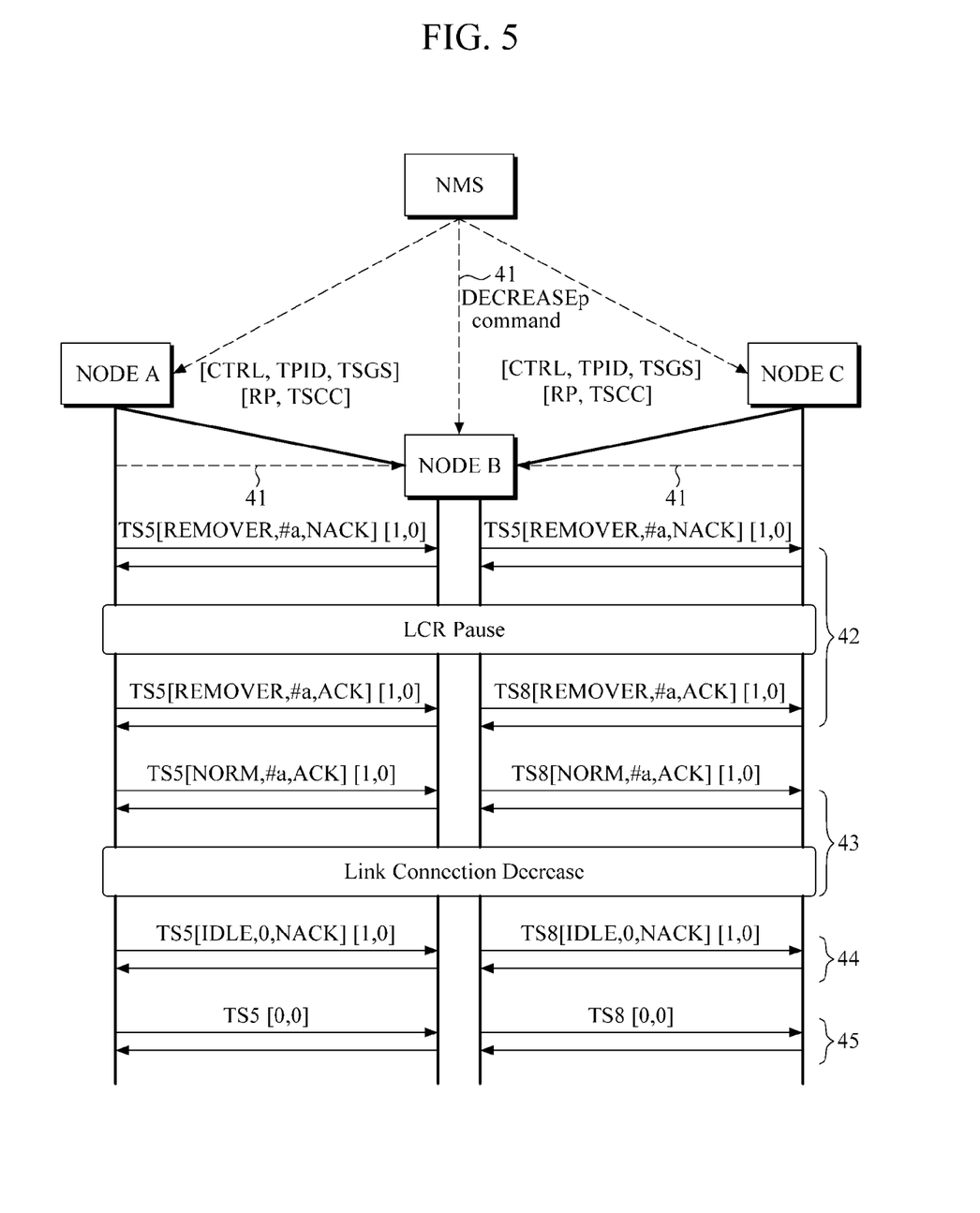
FIG. 5 is a flow chart illustrating an example in which operation 20 in FIG. 3 is applied in decreasing a network connection.

FIG. 5 is a flow chart illustrating a procedure of decreasing network connection of an ODUflex signal transmitted via a protection path in the event that a bandwidth of an ODUflex signal transmitted via a working path W in the optical transport network shown in FIG. 2 is decreased, for example when the number of TS is decreased from 3 to 2. That is, FIG. 5 illustrates an example in which operation 20 in FIG. 3 is applied in a network connection decreasing procedure. In addition, it is apparent that number indicating a TS to be removed (that is, TS5 and TS8 in FIG. 5), and a numerical value in the TPID field of TS5 and TS 8 (that is, #a) are exemplary. Further, in FIG. 5, what is indicated by "REMOVE", "NORM" or "IDLE" which is commands in the CTRL field, what is indicated by "NACK" or "ACK" which corresponds to a TSGS bit, what is indicated by "0" which corresponds to a TSCC bit, and what is indicated by "0" or "1" which corresponds to RP bit complies with the above-described the ITU-T G.7044/Y.1347(10/2011) standard, so that details description thereof are not provided herein.

Referring to FIG. 5, a command for decreasing the number of TSs is transmitted from an NMS or a control plane to nodes of the protection path in operation 41. The command may be transmitted from the NMS or the control plane directly to nodes of the protection path, such as the nodes A, B and C. Alternatively, the command may be transmitted from the NMS or the control plane only to end nodes located at both ends of a link, such as the nodes A and C or to all the nodes of the working path W, except for nodes only located at the protection path P (for example, the node B). In the latter case, nodes not receiving the command from the NMS or the control plane receive the same command from other nodes that has received the command directly or indirectly from the NMS. In addition, a signal may be inserted into HO OPUk RCOH or HO ODUk overhead to thereby be transmitted from an end node, such as the nodes A and B, to an intermediate node, such as the node B.

The above-described increase command is a protection-path resize command, for example, a decrease command, and the name thereof is merely exemplary. The decrease command is a command indicating execution of only an LCR protocol among the resize procedure according to the ITU-T G.7044/Y.1347(10/2011) standard. In a preferable example, a type of the decrease command is distinguishable from a decrease command received from an NMS or a control plane according to the ITU-T G.7044/Y.1347(10/2011) standard. However, aspects of the present invention is not limited thereto, and a type of the decrease command may be identical to a decrease command received from an NMS or a control plane according to the ITU-T G.7044/Y.1347(10/2011) standard. In the latter case, nodes receiving the decrease command need to be configured to execute only an LCR protocol, except for a BWR protocol.

The nodes receiving the decrease command (for example, the nodes A, B and C) start to initiate the LCR protocol in operation 42. Specifically, each of the node checks consistent configuration of a TS to be removed or a set of TSs to be removed. According to the ITU-T G.7044/Y.1347(10/2011) standard, if a TS to be removed according to a signal that is transmitted and received after the check of consistent configuration is the same as a TS that is determined to be removed by a corresponding node, the corresponding node suspends the LCR protocol and then immediately initiate the BWR protocol. However, according to an exemplary embodiment of the present invention, although passing the check of consistent configuration, a corresponding node does not initiate the BWR protocol while continuously executing the LCR protocol and, even when suspending the LCR protocol, immediately resumes the LCR protocol.

More specifically, whether the nodes receiving the decrease command (for example, the nodes A, B and C) use a TS to be removed is checked. Then, with respect to adjacent nodes, each of the nodes exchanges HO OPUk OH indicating [REMOVE, #a, NACK] and [1, 0] respectively corresponding to [CTRL, TPID, TSGS] and [RP, TSCC] of HO OPUk RCOH. After checking whether a signal indicating "REMOVE" in the CTRL field is received from any adjacent node and whether configuration of a TS of a local port is the same as that of a TS of a port of the adjacent node, each node (or a port of each node) does not initiate the BWR protocol while continuously executing the LCR protocol, rather than suspending the LCR protocol. Thus, with respect to adjacent nodes, each node (or a port of each node) exchanges HO OPUk OH indicating [REMOVE, #a, ACK] and [1, 0] respectively corresponding to [CTRL, TPID, TSGS] and [RP, TSCC] of HO OPUk RCOH.

As such, if a signal including CTRL=REMOVE and TSGS=ACK is exchanged, each node (or a port of each node) starts to decrease a link connection in operation 43. Specifically, each node transmits [NORM, #a, ACK], rather than [REMOVE, #a, ACK] to every TS to be removed at a resize multiframe boundary after receiving the signal including CTRL=REMOVE and TSGS=ACK, and then starts to decrease a link connection. The change from [REMOVE, #a, ACK] to [NORM, #a, ACK] notifies a downstream port that link connection decrease will start at the next resize multiframe boundary.

Then, each node, that is, each of the nodes A, B and C, completes the LCR resize. In addition, after receiving a signal set to include "NORM" in the CTRL field, each node transmits [IDLE, 0, NACK] so as to suspend or interrupt the LCR protocol in operation 44. And, if whether a signal set to include "IDLE" in the CTRL field is received from any adjacent node is checked, the LCR protocol is terminated. The termination of the LCR protocol leads to termination of the HAO procedure according to the ITU-T G.7044/Y.1347(10/2011) standard, without executing the BWR protocol, in operation 45. In this embodiment, there is no limitation in a method for terminating the HAO procedure without executing a BWR protocol. For example, as shown in operation 45 in FIG. 5, each node may terminate the HAO procedure by transmitting and receiving a signal set to include "0" in the RP field. The transmission of the signal may be possible using HO OPUk RCOH, but it is merely exemplary.

As described above, in a procedure of resizing network connection in an optical transport network that receives an ODUflex signal and supports protection switching of the present invention, both an LCR protocol and a BWR protocol are executed with respect to a working path, but only the LCR protocol is executed with respect to a protection path according to the ITU-T G.7044/Y.1347(10/2011) standard. It is because a bandwidth of the protection path does not need to be changed through the resize procedure since an actual data signal is not transmitted via the protection path. According to the exemplary embodiment of the present invention, it is possible to resize network connection of a working path even in an optical transport network so as to satisfy the ITU-T G.7044/Y.1347(10/2011) standard. In addition, the resize procedure may be completed by changing or adding a signal to be transmitted and/or received on the protection path according to the ITU-T G.7044/Y.1347(10/2011) standard.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for resizing a network connection in an optical transport network that supports protection switching and receives a flexible Optical channel Data Unit (ODUflex (GFP)) signal, the method comprising:
   executing, at second nodes located on a working path for protection switching, both a Link Connection Resize (LCR) protocol and a Bandwidth Resize (BWR) protocol; and
   executing, at first nodes located on a protection path for protection switching, only the LCR protocol and omitting the BWR protocol, of Hitless Adjustment of ODUflex(GFP) (HAO) procedure,
   wherein a protection-path resize command indicating only the LCR protocol, and omitting the BWR protocol, to be executed is received by the first nodes from a Network Management System (NMS) or a control plane.

2. The method of claim 1, wherein the protection-path resize command is a protection-path INCREASE$_P$ command, and the HAO procedure is terminated without executing the BWR protocol when the LCR protocol is completed.

3. The method of claim 1, wherein the protection-path resize command is a protection-path DECREASE$_P$ command, and the HAO procedure is terminated without executing the BWR protocol by completing the LCR protocol that has been never suspended ever since initiation thereof.

4. The method of claim 1, wherein the protection-path resize command is transmitted from the NMS or the control plane only to end nodes, except for intermediate nodes, among the first nodes.

5. The method of claim 1, wherein the protection-path resize command is transmitted from the NMS or the control plane to all of the first nodes.

6. A method for increasing a network connection in an optical transport network that support protection switching and a flexible Optical channel Data Unit (ODUflex(GFP)) signal, the method comprising:
   initiating, at first nodes located on a protection path for protection switching, a Link Connection Resize (LCR) protocol of Hitless Adjustment of ODUflex(GFP) (HAO) procedure;
   increasing, at the first nodes, a link connection to increase a number of tributary slots (TSs); and
   terminating the HAO procedure without executing, at the first nodes, a Bandwidth Resize (BWR) protocol of the HAO procedure.

7. The method of claim 6, wherein, in the initiating of the LCR protocol, High Order-Optical channel Payload Unit-k overhead (HO OPUk OH) indicating "ADD" in a CTRL field of LCR protocol overhead is used.

8. The method of claim 6, further comprising terminating the HAO procedure by executing both the LCR protocol and the BWR protocol at second nodes located on a working path for protecting switching.

9. The method of claim 6, further comprising:
   before the initiating of the LCR protocol, transmitting from a Network Management System (NMS) or a control plane to the first nodes a protection-path INCREASE$_P$ command indicating execution of only the LCR protocol, except for the BWR protocol.

10. A method for decreasing a network connection in an optical transport network that support protection switching and a flexible Optical channel Data Unit (ODUflex(GFP)) signal, the method comprising:
    initiating, at first nodes located on a protection path for protection switching, a Link Connection Resize (LCR) protocol of Hitless Adjustment of ODUflex(GFP) procedure;
    decreasing, at the first nodes, a link connection to decrease a number of tributary slots (TSs); and
    terminating the HAO procedure without executing, at the first nodes, a Bandwidth Resize (BWR) protocol of the HAO procedure ever since the initiation of the LCR protocol.

11. The method of claim 10, wherein, in the initiating of the LCR protocol, High Order-Optical channel Payload Unit-k overhead (HO OPUk OH) indicating "REMOVE" in a CTRL field of LCR protocol overhead is used.

12. The method of claim 10, further comprising:
terminating the HAO procedure by executing both the LCR protocol and the BWR protocol at second nodes located on a working path for protection switching.

13. The method of claim 10, further comprising:
before the initiating of the LCR protocol, transmitting from a Network Management System (NMS) or a control plane to the first nodes a protection-path $DECREASE_P$ command indicating execution of only the LCR protocol, except for the BWR protocol.

* * * * *